(12) United States Patent
Parasnis

(10) Patent No.: US 9,129,246 B2
(45) Date of Patent: *Sep. 8, 2015

(54) SYSTEM AND METHOD FOR FACILITATING COMMUNICATION OF DATA AMONG ENTITIES IN AN ELECTRONIC TRADING NETWORK

(71) Applicant: JDA Software Group, Inc., Scottsdale, AZ (US)

(72) Inventor: Abhay V. Parasnis, Coppell, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/100,755

(22) Filed: Dec. 9, 2013

(65) Prior Publication Data

US 2014/0101070 A1 Apr. 10, 2014

Related U.S. Application Data

(63) Continuation of application No. 10/051,826, filed on Jan. 16, 2002, now Pat. No. 8,606,965.

(60) Provisional application No. 60/283,246, filed on Apr. 11, 2001.

(51) Int. Cl.
*G06F 15/16* (2006.01)
*G06Q 10/08* (2012.01)
*H04L 29/08* (2006.01)
*G06Q 30/06* (2012.01)

(52) U.S. Cl.
CPC .............. *G06Q 10/083* (2013.01); *G06Q 30/06* (2013.01); *H04L 67/2823* (2013.01)

(58) Field of Classification Search
None
See application file for complete search history.

(56) References Cited

U.S. PATENT DOCUMENTS

| | | | |
|---|---|---|---|
| 5,202,977 A | 4/1993 | Pasetes et al. | |
| 5,557,780 A | 9/1996 | Edwards et al. | |
| 5,897,645 A | 4/1999 | Watters | |
| 5,909,570 A | 6/1999 | Webber | |

(Continued)

OTHER PUBLICATIONS

Nguyen, Judy, "An Analysis and Comparison of E-Commerce Transaction Protocols—Purchasing Order", published Summer 1999, 66 pages and downloaded on Feb. 14, 2013 from http://www.engr.sjsu.edu/gaojerry/course/cmpe296u/slides/survey.pdf.*

(Continued)

*Primary Examiner* — Paul Danneman
(74) *Attorney, Agent, or Firm* — Jackson White, PC; Steven J. Laureanti

(57) ABSTRACT

An electronic commerce protocol stack includes a connectivity layer that receives business data from a first entity. The business data indicates that the destination of the business data is a second entity. The protocol stack also includes a translation layer that receives the business data and that translates the business data as appropriate for the second entity using one or more translation rules. The protocol stack also includes a semantic routing layer that receives the translated business data, determines the semantic meaning of at least a portion of the business data using one or more semantics rules, determines one or more appropriate destinations for the business data based on the semantic meaning, and communicates the business data the determined destinations to the connectivity layer. The connectivity layer communicates the business data to the determined destinations.

20 Claims, 3 Drawing Sheets

(56) References Cited

U.S. PATENT DOCUMENTS

| | | | |
|---|---|---|---|
| 6,032,147 | A | 2/2000 | Williams et al. |
| 6,295,561 | B1 | 9/2001 | Nagy |
| 6,397,232 | B1 | 5/2002 | Cheng-Hung et al. |
| 6,418,400 | B1 | 7/2002 | Webber |
| 6,453,356 | B1 | 9/2002 | Sheard et al. |
| 6,516,353 | B1 | 2/2003 | Richards |
| 6,601,071 | B1 | 7/2003 | Bowker et al. |
| 6,636,845 | B2 | 10/2003 | Chau et al. |
| 6,658,483 | B1 | 12/2003 | Iwamoto et al. |
| 6,725,426 | B1 | 4/2004 | Pavlov |
| 6,748,569 | B1 | 6/2004 | Brooke et al. |
| 6,757,739 | B1 | 6/2004 | Tomm et al. |
| 6,772,180 | B1 * | 8/2004 | Li et al. .................. 715/229 |
| 6,772,216 | B1 | 8/2004 | Ankireddipally et al. |
| 6,806,890 | B2 | 10/2004 | Audleman et al. |
| 6,871,187 | B1 | 3/2005 | Gosko |
| 6,971,106 | B1 | 11/2005 | Nakamura et al. |

OTHER PUBLICATIONS

Nguyen, Judy, "An Analysis and Comparison of E-Commerce Transaction Protocols—Purchasing Order", published Summer 1999, 66 pages and downloaded on Feb. 14, 2013 from http://www.engr.sjsu.edu/gaojerry/course/cmpe269u/slides/survey.pdf.

* cited by examiner

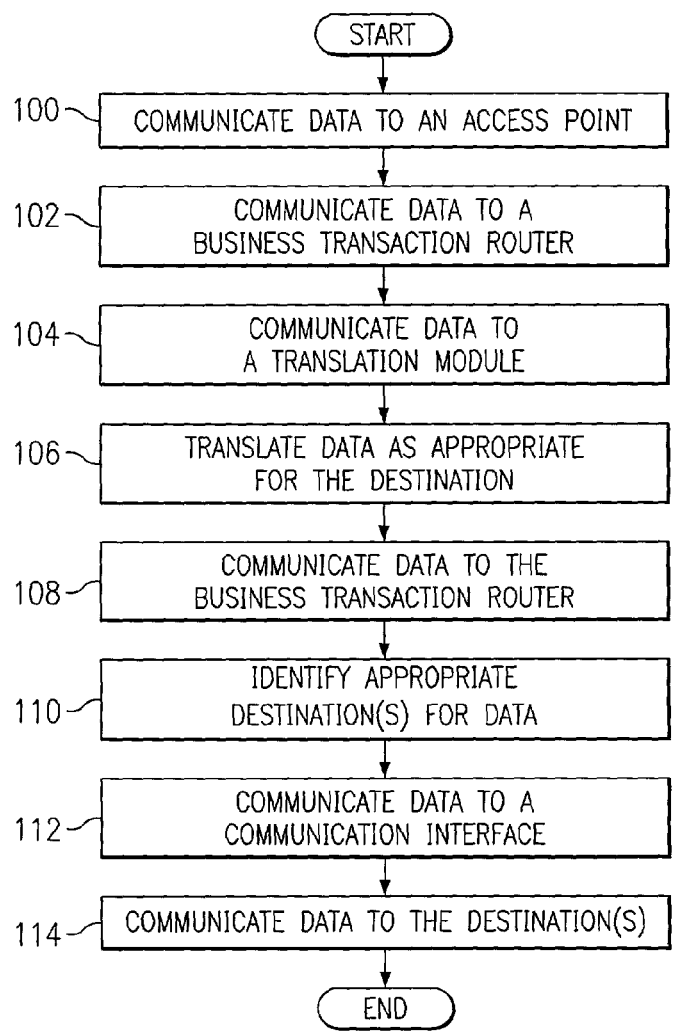

SYSTEM AND METHOD FOR FACILITATING COMMUNICATION OF DATA AMONG ENTITIES IN AN ELECTRONIC TRADING NETWORK

CROSS-REFERENCE TO RELATED APPLICATIONS

This application is a continuation of U.S. patent application Ser. No. 10/051,826, filed on Jan. 16, 2002, entitled "System And Method For Facilitating Communication Of Data Among Entities In An Electronic Trading Network," now U.S. Pat. No. 8,606,965 which claims the benefit under 35 U.S.C. §119(e) to U.S. Provisional Application No. 60/283,246, filed Apr. 11, 2001. U.S. Pat. No. 8,606,965 and U.S. Provisional Application No. 60/283,246 are assigned to the assignee of the present application. The subject matter disclosed in U.S. Pat. No. 8,606,965 and U.S. Provisional Application No. 60/283,246 is hereby incorporated by reference into the present disclosure as if fully set forth herein.

TECHNICAL FIELD

This invention relates to the field of electronic commerce, and more particularly to an improved technique for electronic commerce communications.

BACKGROUND

It is common in current business-to-business (B2B) or other electronic commerce ("e-commerce") networks to deploy Internet-based collaboration software that attempts to provide a migration from electronic data interchange (EDI) messaging to Internet-based messaging. This is an attempt to perform e-commerce transactions more efficiently and effectively, but problems have occurred since the Internet communication protocols are not currently sufficient to conduct true holistic ecommerce transactions. These problems have occurred, in part, due to several faulty assumptions. One such assumption is that since the Internet is highly scalable, e-commerce transactions based on the Internet will also be scalable. Another faulty assumption that has been made is that B2B networks are just a simple technology migration of existing network connectivity models (for example, EDI). Yet another such assumption is that since the cost of connectivity is significantly lower for the Internet, the overall cost of running B2B workflows will be inherently lower. Each of these faulty assumptions, along with many others, have contributed to the current problems with B2B networks.

Furthermore, EDI protocols have a well understood and defined meaning and are semantically rich relative to flat Internet-based data traffic. Therefore, companies joining e-commerce networks typically must choose between the simplicity of connectivity and low cost of the Internet and the rich semantics of EDI. Even if a company has created a competitive advantage by using custom maps and custom extensions specific to their business, the company must stop using these custom tools and do business in a standard way in order to get the benefits of the Internet. By doing this, the company is essentially giving up their own business semantics in order to get the connectivity, simplicity, and low cost of Internet business communications.

SUMMARY

According to the present invention, disadvantages and problems associated with previous electronic commerce communication techniques have been substantially reduced or eliminated.

According to one embodiment of the present invention, an electronic commerce protocol stack includes a connectivity layer that receives business data from a first entity. The business data indicates that the destination of the business data is a second entity. The protocol stack also includes a translation layer that receives the business data and that translates the business data as appropriate for the second entity using one or more translation rules. The protocol stack also includes a semantic routing layer that receives the translated business data, determines the semantic meaning of at least a portion of the business data using one or more semantics rules, determines one or more appropriate destinations for the business data based on the semantic meaning, and communicates the business data and the determined destinations to the connectivity layer. The connectivity layer communicates the business data to the determined destinations.

Particular embodiments of the present invention provide one or more technical advantages. For example, certain embodiments include an electronic commerce protocol stack that provides connectivity, translation services, and semantic routing based on business rules. For example, such a protocol stack may be used to enable communications in a trading network. In such embodiments, Internet or other common network communication protocols may be used for connectivity, but are not overextended to provided semantic routing. Instead, additional protocols are provided for this semantic routing, as well as for translation. Furthermore, the protocol stack is extensible to allow entities to customize their communications for their particular needs. This protocol stack thus enables low-cost and reliable connectivity between entities, but unlike current alternatives, does not require entities to give up their custom business semantics in order to get the connectivity, simplicity, and low cost of Internet business communications. Moreover, the protocols included in the protocol stack (the "layers" of the protocol stack) may reside in the same or different locations. The location at which each layer resides and is executed may be reconfigured dynamically and is transparent to the other layers in the protocol stack. In addition, the protocol stack also provides the ability to more simply and effectively synchronize and partition data amongst various network components in an electronic trading network.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 4 illustrates an example method of communicating data using XPS.

DETAILED DESCRIPTION

Traditionally, businesses have typically used electronic data interchange (EDI) to communicate with one another and conduct business transactions. EDI has a few standard, well-known formats that are used by businesses for exchanging business data, such as ANSI X12 and EDIFACT. An EDI message contains a string of data elements, each of which represents a piece of information, such as a price or product model number, separated by delimiter. The entire string is called a data segment. One or more data segments framed by a header and trailer form a transaction set, which is the EDI unit of transmission. A transaction set often includes the data that would usually be contained in a typical business document or form. Therefore, businesses can exchange EDI transmissions instead of actual documents.

However, due to the enormous popularity and expansive connectivity of the Internet and the world wide web, many businesses have migrated from a true EDI environment to web-based environment (that may or may not use aspects of EDI). In an attempt to provide EDI over the web, one solution is modify an EDI data file to put it in a format appropriate for communication over the web using the extensible markup language (XML), the hypertext markup language (HTML), or any other appropriate languages or data formats. Documents created using these languages and data formats may be communicated over the web using the hypertext transport protocol (HTTP) or any other appropriate communication protocols. However, although such a solution may address the connectivity needs of business, it only partially addresses the need to translate business transactions from one format to another and does not attempt to address the need to semantically route business transactions based on the content of the transactions. The Internet and current methods of enabling electronic commerce ("e-commerce") transactions provide connectivity, but fail to provide rich translation schemes. EDI provides richer capabilities, but lacks the connectivity and low cost of the Internet. Therefore, businesses currently have to choose between the simplicity of connectivity and low cost of the Internet and the richer, but more complex and costly capabilities of EDI. However, neither option provides semantic routing capabilities that would be desirable in many business transactions.

Figure 1:
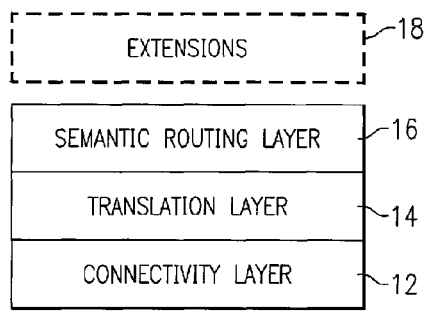
FIG. 1 illustrates an example extensible protocol stack (XPS) that may be used to facilitate e-commerce transactions.

FIG. 1 illustrates an example extensible protocol stack (XPS) 10 that may be used to facilitate e-commerce transactions. XPS 10 may be used to address the disadvantages of other techniques described above. XPS 10 includes three primary layers: a connectivity layer 12, a translation layer 14, and a semantic routing layer 16. XPS 10 may also be extended, if appropriate for a particular business, through one or more custom industry-specific or transaction-specific extensions 18 to one or more of the three layers 12, 14, and 16. XPS 10 may use Internet connectivity for connectivity layer 12 (although other types of connectivity techniques may be used) and then provide additional translation and routing protocols in translation layer 14 and semantic routing layer 16, respectively. Therefore, an e-commerce solution, such as a business-to-business (B2B) network, in which XPS 10 is implemented uses the Internet only for what it was meant for: a low-cost and scalable connectivity backbone. However, by providing additional layers 14 and 16, business do not all have to use a common set of transaction meanings and are thus able to customize their business transaction.

Connectivity layer provides one or more communication protocols that allow business data to be communicated from one location to another. For example, a business may communicate a spreadsheet document, a word processing document, or an EDI document using connectivity layer 12 as a transporter to deliver the data. Although the connectivity protocol used does not understand the content of the document, the protocol knows how to connect to the destination of the data and how to communicate the data to the destination. One example of a protocol that may be used in connectivity layer 12 is Transport Control Protocol/Internet Protocol (TCP/IP); however, any other appropriate network communication protocols (such as value added networks) may also or alternatively be used.

Translation layer 14 provides one or more translation mechanisms to map data from one format to another as appropriate for the intended recipient or communication technique. Translation layer 14 may include a set of rules that identify how one document is mapped to another document. As examples only, a rule may identify fields in one document to which each field in another document should be mapped. Such mapping may be used to map one data format, such as EDI, to another data format, such as XML, or may be used to rearrange data in the same data format. Therefore, translation involves receiving a document or other data from connectivity layer 12, reviewing the contents of the document or other data, and converting the contents, if appropriate, based on one or more rules. The mechanisms used by translation layer 14 typically do not understand the meaning of the contents are or the context of the document in a particular business transaction, but these mechanisms (such as rules) are able to identify particular content structures or formats and translate it to some other specified content structures or formats.

Although connectivity layer 12 allows rudimentary routing of communications to specified destinations, semantic routing layer 16 provides much more sophisticated routing techniques. Routing layer 16 uses semantics rules to identify the content in a communication, interpret the semantic meaning of the content, and route the communication appropriately. For example, routing layer 16 may examine a document and determine that it is a purchase order for an item, that the due date is less than two days away, that the dollar value is greater than one million dollars, and that the item is to be shipped to a country that has particular customs regulations. Based on these criteria, a semantics rule may determine that the item needs to be sent in an expedited fashion and may communicate the purchase order to a particular destination or flag the purchase order in a particular manner. Alternatively, the semantics rules may determine that customs clearance will take five days and that there is no point in routing the purchase order to the seller since an on-time delivery is not possible. Instead, routing layer 16 may just send an exception message back to the buyer. It will be understood that many other types of semantic rules may also be used. Therefore, routing layer 16 is actually interpreting that data's semantic meaning and basing decisions on this meaning. This semantic routing may be performed based on general business rules and processes and based on specific variations of particular entities. Semantic routing layer 16 may also take action on behalf of a destination instead of actually sending the data.

The following is an example scenario illustrating the use of XPS 10. The scenario involves purchase order transactions generated by two buyers that are communicated to the same seller. Reference to the first and second buyers and the seller is meant to encompass not only the actual entities, but also the computers and networks associated with those entities. The first buyer uses EDI, the second buyer uses XML documents communicated using HTTP, and the seller uses XML documents communicated using a guaranteed message bus. The first buyer uses custom extensions to its EDI messages, such as EDI-850 messages, by using optional/configuration fields to communicate additional item-specific information to the seller. However, the first buyer does not have any semantic rules regarding purchase order processing. The second buyer does not use custom extensions, but the second buyer and the seller have agreed to certain rules regarding purchase order processing. For example, if a purchase order is for one of a pre-determined set of items, the purchase order needs an approval by a manager at the buyer before the purchase order is sent to the seller. For all other items, no approval is needed on the buyer side. Furthermore, another rule may state that if a purchase order is for a ship-to location within Europe, then only a certain subset of items are valid subjects of the purchase order. Also, such purchase orders should be only sent to the European location of the seller. Moreover, yet another rule may state that if a purchase order delivery date is within a week from the origination date, then the seller needs to be notified automatically about expediting the process. Another rule may state that if the purchase order dollar amount is above one million dollars, then the purchase order should be automatically sent to the first buyer's corporate site for review and approval.

As an example only, the first and second buyers and the seller may use XPS 10 to communicate or process a purchase order in the following manner. The first buyer may use connectivity layer 12 to connect their existing network, such as an EDI-VAN (value added network) backbone, into the e-commerce network using XPS 10. Possible configurations for deploying this arrangement include running a local EDI-XML translation server or using a hosted version running on the e-commerce network. The first buyer uses translation layer 14 to map its EDI documents to XML documents that the seller can understand. Since the first buyer uses custom EDI extensions, some of the maps used to perform the translation are specific to the relationship between the first buyer and the seller and are defined in a translation repository associated with the first buyer (and possibly associated with other entities). The translation repository may be running locally within at the first buyer's internal network or the repository may be hosted on the e-commerce network. If the first buyer decides to migrate from its EDI-based backbone to a pure XML-based backbone, the underlying connectivity layer 12 of its associated XPS 10 would need to be reconfigured but translation layer 14 would remain mostly intact. Furthermore, since the first buyer does not have processing rules set up with the seller, the first buyer does not utilize semantic routing layer 16.

The second buyer may use connectivity layer 12 to connect to the e-commerce network using XML over HTTP as the connectivity protocol. For example, the second buyer may communicate with a web server that allows the second buyer to upload XML documents using secure HTTP. The second buyer then uses translation layer 14 to normalize its proprietary XML formats to either a network-standard canonical XML or directly to XML formats specific to the seller. Alternatively, both the second buyer and the seller may adopt the network-standard format or another mutually agreed-to format, in which case there would be no need for a translation. Since the second buyer and the seller have agreed to certain rules regarding the processing of purchase orders, the second buyer uses semantic routing layer 16 to model the rules described above using an XML-based meta-language or any other appropriate language. Either or both of translation layer 14 and routing layer 16 may be implemented locally at the second seller or at a shared web server on the ecommerce network (or at any other appropriate location(s), such as at the second buyer). Additional rules may be added to the implementation of routing layer 16 as the business relationship between the second buyer and the seller evolves. Furthermore, additional categories of rules for purchase orders may be used. These rules may include customs or country/region specific rules, transportation/warehousing related rules, time-sensitivity based routing rules, product family based storage rules, and any other appropriate types of rules. Moreover, the communication of a purchase order is used only as an example and any other appropriate business transactions may be performed using XPS 10.

Since the seller has already implemented a message bus-based guaranteed delivery protocol, the seller most likely will not require any sophisticated support for connectivity using XPS 10. The only portion that the seller may use from connectivity layer 12 is a thin wrapper service that allows the internal message bus to communicate messages to and receive messages from the e-commerce network (using the messaging protocol used by the e-commerce network). The seller uses translation layer 14 to normalize its proprietary XML formats to either a network-standard canonical XML or directly to the XML formats specific to the second buyer and the EDI formats specific to the first buyer.

It is also possible that the seller may adopt the network-standard formats in which case the only translations needed would be from the network-standard XML to the XML formats specific to the second buyer and the EDI formats specific to the first buyer (including custom extensions defined by the first buyer for the seller). Physical deployment of translation layer 14 for the seller may be a private local version or a shared network version. Since the seller has to deal with buyer-specific maps and translations as well as with multiple buyers, the seller may likely choose a private deployment. In addition, since the second buyer and the seller have agreed to certain rules relating to the processing of purchase orders, the seller uses routing layer 16 in the same manner as the second buyer, as described above and the seller may add new rules to routing layer 16 later as the business relationship between itself and any of its buyers evolves.

Figure 2:
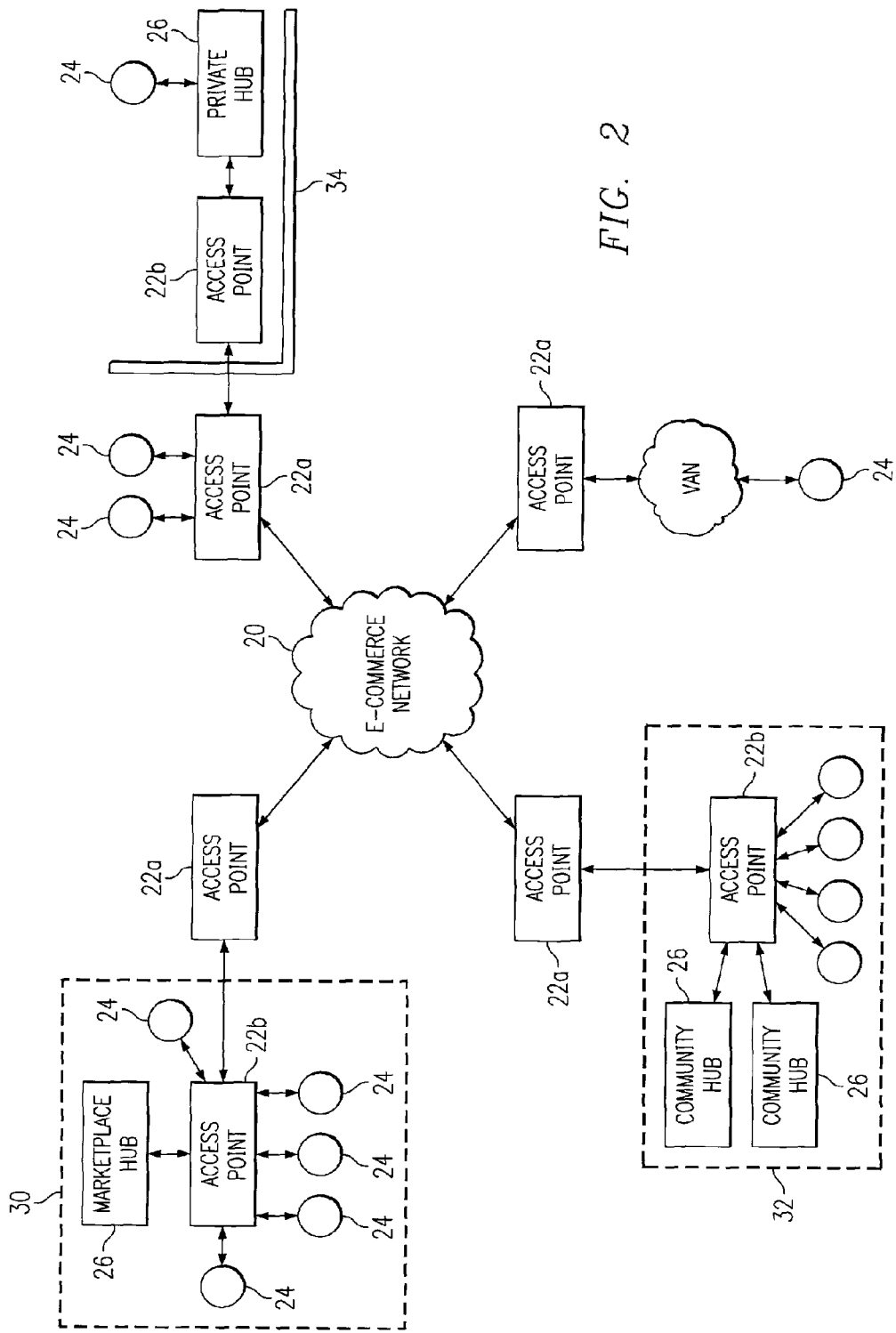
FIG. 2 illustrates an example network topology in which XPS may be used to facilitate e-commerce transactions.

FIG. 2 illustrates an example network topology in which XPS 10 may be used to facilitate e-commerce transactions. It should be understood that the use of XPS 10 is in no way limited to its use in the example e-commerce network 20 described below. The example topology includes e-commerce network 20, which may include a number of interconnected networks including the Internet, one or more wide area networks (WANs), one or more metropolitan area networks (MANs), and/or one or more local area networks (LANs). A plurality of network access points 22 are coupled to e-commerce network 20 (and may be considered part of e-commerce network 20) and implement one or more layers of XPS 10 to allow a plurality of business or other participants 24 to communicate and conduct business transactions. The example topology also includes a plurality of e-commerce hubs 26. Hubs 26 may provide a local intelligence and coordination point for a subset of one or more participants 24 coupled to e-commerce network 20. For example, hubs 26 may enable business workflows and services between participants 24. However, XPS 10 may be implemented without the use of hubs 26.

As described above, access points 22 may be used to implement the layers of XPS 10. Each access point 22 may not implement every layer of XPS 10, either because every layer is not needed by the participant(s) using the access point 22 or because the layers are provided through a combination of access points 22. Access points 22 may be servers, routers, hubs, bridges, or any other appropriate components that are capable of implementing one or more layers of XPS 10 (that are "XPS-aware"). In the example topology, access points 22a are public access points included in e-commerce network 20 that may be accessed by any participant 24 to communicate with another participant 24 (the communications may be facilitated using one or more access points 22). In addition, subsets of one or more participants may have associated private or shared access points 22b. For example, a marketplace 30 may have an associated access point 22b shared by the marketplace participants, a community 32 of participants may share an access point 22b, and a participant 24 may have a private access point 22b behind a firewall 34. Private or shared access points 22b may be used to provide particular connectivity, translation, or semantic routing needs shared by a subset of participants 24 (or of a single private participant 24).

As described above, connectivity layer 12 may be implemented using Internet routing protocols, such as TCP/IP. Such protocols may be provided in a protocol stack (typically software) that executes on a computer. The additional protocol layers 14 and 16 may be implemented in various classes of software. As examples only, layers 14 and 16 may be provided as a wrapper for existing enterprise applications, embedded natively in next-generation network applications, and/or provided in network equipment (such as routers).

The three layers of XPS 10 may be implemented in any appropriate combination. One business might choose to have all three layers "inside" the business (implemented on one or more computers associated with the business). Another business might choose to have layers 12 and 14 inside the business, but share routing layer 16 with other businesses (for example, routing layer 16 may be implemented in a public access point 22a or a private/shared access point 22b). Another option is that a business has none of the three layers implemented locally, and all three layers are provided in e-commerce network 20 (for example, in a public access point 22). Any other appropriate implementations of the layers of XPS 10 may also be used. The flexibility as to where the different layers of XPS 10 may be implemented allows a business to choose an appropriate deployment model for these layers (for example, depending on the size of the business, the amount of transactions the business performs, and the complexity of the transactions). Furthermore, a business can easily reconfigure the layers and change their decisions as to where the layers are implemented. Moreover, the layers can be used in any sequence and can be chained multiple times. For example, one type of connection may be performed, then another connection, then two successive translations, and then appropriate routing.

Figure 3:
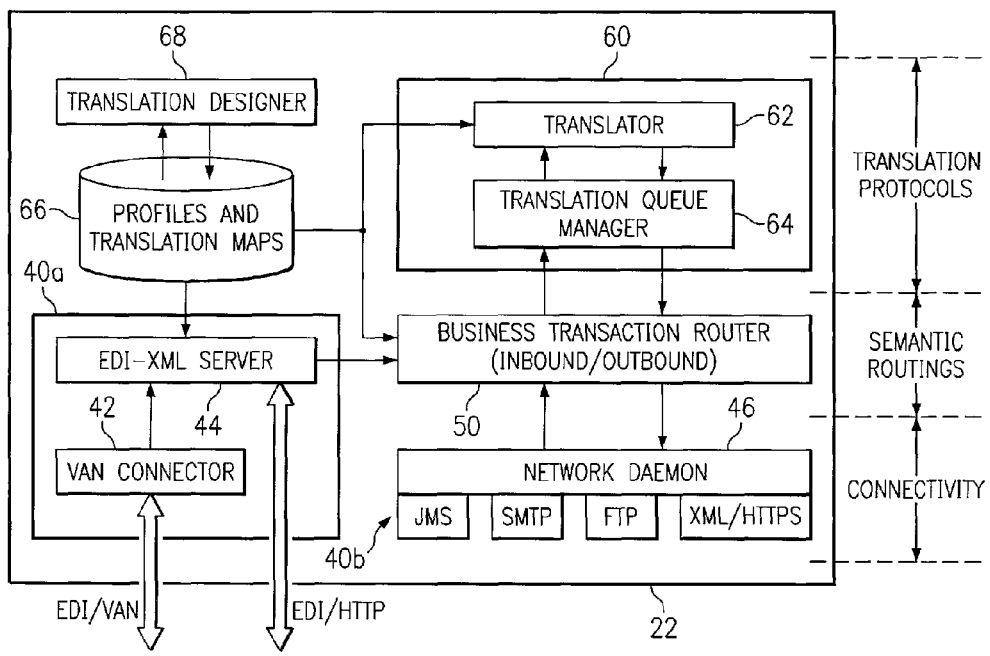
FIG. 3 illustrates an example access point implementing XPS.

FIG. 3 illustrates an example access point 22 implementing all three layers of XPS 10. The example access point 22 includes components for implementing all three layers of XPS 10; however, as described above, other access points 22 may not implement all three layers and may have less and/or different components. The example access point 22 includes two communication interfaces 40a and 40b. Communication interface 40a provides connectivity to EDI data and includes a VAN connector 42 to communicate with participants 24 that are coupled to access point 22 using a VAN. Communication interface 40a also includes an EDI-XML server 44 that communicates EDI data to and receives EDI data from participants 24 coupled to communication interface 40a (those participants 24 using EDI). Communication interface 40b includes a network daemon 46 that may receive data from and communicate data to participants 24 using appropriate communication protocols, such as XML/HTTP, file transfer protocol (FTP), simple mail transfer protocol (SMTP), and JAVA message service (JMS). Any other appropriate communication protocols may also or alternatively be used.

Access point 22 also includes a business transaction router 50 that receives data from communication interfaces 40 and communicates the data, if appropriate, to a translation module 60. Translation module 60 includes a translator 62 that translates data, as described above, and a translation queue manager 64 that controls the flow of data to and from translator 62.

Access point 22 also may include a data storage location 66 where profiles and translation maps may be stored for use in performing translations. In addition, access point 22 may include a translation designer 68 that provides a user with the ability to create custom profiles and translation maps. After data has been translated (if translation was needed), the data is communicated back to business transaction router 50, which performs the semantic routing described above. The data is communicated to the destination identified by business transaction router 50 using communication interface 40a and/or 40b.

FIG. 4 illustrates an example method of communicating data using XPS 10. It should be understood that although the example method describes the use of all three layers of XPS 10, less than all three layers may be used in a particular transaction, as described above. The method begins at step 100 when a buyer (or other participant) communicates data using an appropriate communication protocol to a communication interface 40 or other component of an access point 22 implementing connectivity layer 12. The access point 22 may be associated with the buyer (a private or shared access point 22b) or may be a public access point 22a. The data indicates that a particular seller is the destination of the data. At step 102, communication interface 40 or other connectivity component communicates the data to a business transaction router 50 or other component implementing semantic routing layer 16. This component may be in the same or a different access point 22. Assuming the data needs to be translated for the seller, business transaction router 50 communicates the data at step 104 to a translation module 60 or other appropriate component implementing translation layer 14. This component may be in the same or a different access point 22. At step 106, translation module 60 translates the data as appropriate for the destination seller according to one or more profiles and translation maps.

The translated data is communicated to the same or a different business transaction router 50 or other component implementing semantic routing layer 16 at step 108. This assumes that the data needed to be translated, which is not always the case. Furthermore, data may alternatively be communicated to translation module 60 from the communication interface 40 and then communicated to business transaction router 50 after any appropriate translation. At step 110, business transaction router 50 uses semantics rules to identify the content in a communication, interpret the semantic meaning of the content, and route the communication appropriately, as described above. At step 112, business transaction router 50 communicates the data to an appropriate communication interface 40 of the same or a different access point 22 and identifies the appropriate destination(s) that were determined using the semantic meaning. Communication interface 40 communicates the data to the appropriate destination(s) at step 114 and the method ends. It should be noted that the data may be communicated through one or more additional access points 22 before reaching the destination(s).

In addition to the advantages described above, XPS 10 also provides the ability to more simply and effectively synchronize and partition data amongst various network components, such as hubs 26. Multiple techniques may be used for enabling actual physical data synchronization of hubs 26 or other network components. These techniques include, but are not limited to, automatic replication of transaction routing, database replication technologies, and batch updates utilizing net-change techniques. Networks using XPS 10 may have sophisticated synchronization policies that support a highly granular definition of data to be synchronized and that support profile/permissibility based data synchronization operations.

Once the appropriate data is synchronized in appropriate location, XPS 10 uses intelligent routing algorithms coupled with a pure discovery based configuration (does not require static master-slave relationships) to enable automatic re-direction of transactions to appropriate synchronized data locations. For example, a transaction may be typically routed by one or more access points 22 to a particular hub 26 based on the semantic meaning of the content of the transaction, as described above. However, if that particular hub 26 fails or is otherwise unavailable, then an access point 22 or other network component implementing XPS 10 may automatically redirect the transaction to a hub 26 containing a synchronized copy of the data located at the inoperable hub 26 (particular data that is needed for the transaction). This automatic redirection is made possible through the use of semantic routing layer 16, which allows network components, such as access points 22, to determine where to redirect transactions based on the content of the transaction. For example, different types of data contained in a hub 26 may be synchronized in different locations based on the data type. Access points 22 or other network components may redirect a transaction to the appropriate synchronized data location based on the type of data that is required for the transaction (using semantic routing layer 16 to determine the type of data that is required for the transaction). The locations of the different types synchronized data may be defined in a profile that the access point 22 may use to determine to which location a transaction should be redirected.

While synchronization of hubs solves a critical fail-over problem, it does not address the problem of model scalability. Partitioning of data allows for a truly distributed representation of business logic and rules on the network. XPS 10 (implemented in access points 22 or other network components) can be used to make intelligent decisions pertaining to model partitioning. For example, a first hub 26 may include data relating to a first category of products and a second hub 26 may include data relating to a second category of products. An access point 22 coupled to both hubs 26 may use semantic routing layer 16 and any other appropriate logic to determine to which hub 26 a particular transaction should be routed based on the product information contained within the transaction. Furthermore, data may be partitioned in any other appropriate ways (such as by site, by company division or organization, by time, or by approval).

While partitioning does make distributed real-time transactions feasible, in general this is a difficult problem to scale. As such, it may be desirable to define workflows and transactions so as to minimize the need for large volumes of such real-time transactions. On the other hand, batch-oriented or messaging-oriented systems work very well with partitioned systems as long as partitioning is done along some well-known business dimensions (for example, products, sites, company divisions, or the like).

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system that facilitates communication of data among entities in an electronic trading network, comprising:
a computer system, comprising a semantic routing layer tangibly embodied on a computer-readable medium and configured to:
receive data from a first entity using a connectivity protocol;
interpret the content of the data using one or more semantic rules, wherein the content of the data interpreted using one or more semantic rules comprises one or more of:
a deadline associated with the data;
a monetary value associated with the data; and
a shipping destination associated with the data;
determine one or more entities as a destination for the data based on the semantic meaning of the content of the data; and
determine, based on the one or more semantics rules, whether to communicate the data to the one or more determined entities to the connectivity layer or take action on behalf of the one or more determined entities without communicating the data.

2. The system of claim 1, wherein the connectivity layer is further configured to communicate the data to the one or more determined entities or take action on behalf of the one or more determined entities, based on the one or more semantics rules.

3. The system of claim 1, wherein the semantic routing layer is further configured to interpret the semantic meaning of the content of the data using one or more agreed upon semantics rules to determine a document type associated with the data.

4. The system of claim 1, wherein one or more of the one or more determined entities are associated with a second entity.

5. The system of claim 1, wherein the data includes one or more documents facilitating a business transaction.

6. The system of claim 1, wherein the semantic routing layer is further configured to determine that one or more of the one or more determined entities are unavailable.

7. The system of claim 1, wherein the semantic routing layer is further configured to determine one or more entities for the data based on the semantic meaning and based on a profile of one or more entities at which data associated with the data has been partitioned.

8. A method that communicates data among computers in an electronic trading network, the method comprising:
receiving, using a computer, data from a first entity using a connectivity protocol;
interpreting, using the computer, the content of the data using one or more semantics rules, wherein the content of the data interpreted using one or more semantic rules comprises one or more of:
a deadline associated with the data;
a monetary value associated with the data; and
a shipping destination associated with the data;
determining, using the computer, one or more entities for the data based on the semantic meaning of the content of the data; and
determining, using the computer, based on the one or more semantics rules, whether to communicate the data to the one or more determined entities or take action on behalf of the one or more determined entities without communicating the data.

9. The method of claim 8, the method further comprising communicating the data to the one or more determined entities if the determination is made to communicate the data or taking action, using the computer, on behalf of the one or more determined entities if the determination is made to take action.

10. The method of claim 8, the method further comprising interpreting the semantic meaning of the content of the data using one or more agreed upon semantics rules to determine a document type associated with the data.

11. The method of claim 8, wherein one or more of the one or more determined entities are associated with a second entity.

12. The method of claim 8, wherein the data includes one or more documents facilitating a business transaction.

13. The method of claim 8, further comprising determining that one or more of the one or more determined entities are unavailable.

14. The method of claim 8, further comprising determining one or more entities for the data based on the semantic meaning and based on a profile of one or more entities at which data associated with the data has been partitioned.

15. A non-transitory computer-readable medium embodied with software that communicates data among computers in an electronic trading network, the software when executed using one or more computers is configured to:
    receive data from a first entity using a connectivity protocol;
    interpret the content of the data using one or more semantics rules, wherein the content of the data interpreted using one or more semantic rules comprises one or more of:
        a deadline associated with the data;
        a monetary value associated with the data; and
        a shipping destination associated with the data;
    determine one or more entities for the data based on the semantic meaning of the content of the data; and
    determine based on the one or more semantics rules, whether to communicate the data to the one or more determined entities or take action on behalf of the one or more determined entities without communicating the data.

16. The non-transitory computer-readable medium of claim 15, the software further configured to communicate the data to the one or more determined entities if the determination is made to communicate the data or taking action, using the computer, on behalf of the one or more determined entities if the determination is made to take action.

17. The non-transitory computer-readable medium of claim 15, the software further configured to interpret the semantic meaning of the content of the data using one or more agreed upon semantics rules to determine a document type associated with the data.

18. The non-transitory computer-readable medium of claim 15, wherein one or more of the one or more determined entities are associated with a second entity.

19. The non-transitory computer-readable medium of claim 15, wherein the data includes one or more documents facilitating a business transaction.

20. The non-transitory computer-readable medium of claim 15, the software further configured to determine that one or more of the one or more determined entities are unavailable.

* * * * *